United States Patent
Preti et al.

(10) Patent No.: US 6,611,808 B1
(45) Date of Patent: Aug. 26, 2003

(54) METHOD AND APPARATUS FOR DETERMINING ADDITIONAL BENEFITS AND COSTS FOR AN ANNUITY CONTRACT

(75) Inventors: Charles Paul Preti, Windsor, CA (US); Donald James Dady, Santa Rosa, CA (US)

(73) Assignee: Legacy Marketing Group, San Francisco, CA (US)

( * ) Notice: Subject to any disclaimer, the term of this patent is extended or adjusted under 35 U.S.C. 154(b) by 0 days.

(21) Appl. No.: 09/347,324

(22) Filed: Jul. 2, 1999

(51) Int. Cl.[7] .............................................. G06F 17/60
(52) U.S. Cl. .......................................... 705/4; 705/400
(58) Field of Search ................................ 705/4, 400, 1; 283/54

(56) References Cited

U.S. PATENT DOCUMENTS

| | | | | |
|---|---|---|---|---|
| 5,523,942 A | * | 6/1996 | Tyler et al. .................. | 705/4 |
| 5,752,236 A | * | 5/1998 | Sexton et al. ................ | 705/4 |
| 5,754,980 A | * | 5/1998 | Anderson et al. ............ | 705/4 |
| 5,913,198 A | * | 6/1999 | Banks .......................... | 705/4 |
| 6,064,983 A | * | 5/2000 | Koehler ....................... | 705/4 |
| 6,343,272 B1 | * | 1/2002 | Payne et al. ................. | 705/4 |

FOREIGN PATENT DOCUMENTS

WO  WO 01/150381 A1 * 7/2001

OTHER PUBLICATIONS

Reich–Hale, David; Annuity Firms Offering Banks Products with More Options; Mar. 2001; American Banker; vol. 166, No. 53; p. 8; Dialog copy pp. 1–2.*

* cited by examiner

Primary Examiner—Thomas A. Dixon
(74) Attorney, Agent, or Firm—Thomas, Kayden, Horstemeyer & Risley LLP

(57) ABSTRACT

A method for determining additional death benefits with respect to an annuity contract, the annuity contract being stored in a computer system. The method comprises generating data corresponding to an annuity contract, at least a portion of the data corresponding to information indicating whether an additional beneficiary rider has been selected. If the additional beneficiary rider has been selected in the annuity contract, calculating an additional death benefit to be added to the payments to be provided by the annuity contract.

5 Claims, 5 Drawing Sheets

METHOD AND APPARATUS FOR DETERMINING ADDITIONAL BENEFITS AND COSTS FOR AN ANNUITY CONTRACT

BACKGROUND

1. Field of the Invention

The present invention relates to a method and apparatus for determining benefits and costs associated with annuities. Among other things, the present invention relates to a method and apparatus for determining additional benefits and costs related to tax payments with respect to the death benefit of an annuity contract.

2. Background

Annuities have become a more attractive option for retirement savings. Once, considered noncompetitive and inflexible, annuities have become more popular as annuity providers have introduced products with a variety of flexible tax deferred savings options.

An annuity is a tax-deferred savings vehicle packaged as an insurance product. In most cases when an annuity is bought, its earnings are tax-deferred until the beginning of withdrawal of the interest or other income earned. Because the owner is not paying taxes along the way, the owner has the chance to earn gains on untaxed money, which may grow more quickly than a taxable account does.

There are two broad types of annuities: deferred and immediate. A deferred annuity, allows the owner to wait a while and let the annuity earn money before withdrawing from it; the immediate annuity, begins paying the owner within the first year. The owner may also be permitted to convert the annuity from a deferred to an immediate annuity type.

A deferred annuity has two phases: the accumulation phase and the distribution phase. During the accumulation phase, the owner can contribute as much as he or she wants, subject to Internal Revenue Service restrictions on certain qualified accounts and the earnings in the annuity grow tax-deferred. During the distribution phase, the owner can elect to receive a lump sum or the owner can elect a settlement option.

A settlement option, also known as annuitization, means the owner turns the annuity into a stream of periodic payments for life or for a chosen certain period of time. If the payout phase of an annuity is for life, it pays the owner during his or her entire lifetime. The payments cease when he or she dies. If an annuity's payout is "certain," it pays the owner for a specified period, and if the owner dies before the period ends, then a beneficiary receives the payments until the certain term ends. In other words, if the annuity owner has a certain term, such as 7 years for an annuity but receives only 5 years of payments before dying, then the owner's beneficiary will receive payments for another 2 years, and then after the additional 2 years the payments would cease. An annuity can also be a combination of life and certain terms. For example, the owner can purchase an annuity for "life," but with a certain period of ten years. If the owner lives longer than the ten-year period, the annuity continues to pay throughout the owner's lifetime, and at the owner's death, the payments cease. If the owner dies before the certain term expires, the owner's beneficiary will receive payments until the certain term ends. The security of knowing the owner will get income for a specified period, or for his or her life, is one of the real advantages of electing annuitization. The gains distributed through settlement option payments and withdrawals are generally subject to the income tax. (Typically, with annuitizations only a percentage of each payment is taxable.)

Annuities are further classified as either fixed and variable. A fixed annuity provides a set minimum guaranteed rate of return backed by an insurance company, much as a bank provides a stated rate of return on a certificate of deposit. Although the rate of return varies somewhat depending on the prevailing interest rates, the minimum rate of return adds more stability than a variable annuity. A variable annuity may invest in stocks, bonds, or money market funds, depending upon the type of subaccount chosen. Usually, the subaccount is selected based on the level of risk and return wanted in the annuity, just as when purchasing a mutual fund. The amount of return depends on the actual return of the subaccount investment.

An annuity will vary depending upon the parameters of the "product design." The product design defines the terms of the annuity, including, whether it is fixed or variable, whether the annuity's term is for a certain period or based on the life of the annuitant, whether it is deferred or immediate, the annuity's death benefit (if any), and surrender charges (if any).

Many annuities are set up so that the beneficiaries of the annuity may receive money from the annuity when the owner dies. For example, with a deferred annuity, if the annuitant dies while the annuity is still in the accumulation phase (the phase before the payout phase), the annuitant's beneficiaries will receive whatever amount has accumulated in the annuity. The heirs will need to pay income taxes on any gains, not to mention estate taxes, if the entire estate amounts to more than the current limit (which is currently $650,000). In other words, if $50,000 was contributed to an annuity, and it has grown to $150,000, the heirs would receive the principal plus $100,000 as taxable income if the owner died before the payout phase began. Additionally, in some cases, the insurance company may guarantee to pay the owner's beneficiary the principal amount of the investment if it is greater than the annuity's cash value. As noted before with a "certain" annuity when the payout phase has begun, and the owner dies during the certain period, the owner's beneficiary will receive payments until the end of the certain period.

In the case of annuities that provide a death benefit, a major problem of the heirs or beneficiaries of the annuity after the death of the owner of the annuity is the payment of income taxes; as the beneficiaries are responsible for paying taxes on the gain in the annuity contract. Many heirs and beneficiaries receive the death benefit and have a large portion of it be consumed by income taxes.

SUMMARY OF THE INVENTION

The present invention provides a way for dealing with the tax payment for the beneficiaries of a death benefit of an annuity contract.

The present invention provides a method to determine the additional benefits that may be needed for dealing with the tax payments, funeral expenses and the like associated with the death benefit of an annuity contract.

In one embodiment of the present invention, a method for determining additional income tax benefits with respect to an annuity contract, is provided with the annuity contract being stored in a computer system. The method comprises generating data corresponding to an annuity contract, with at least a portion of the data corresponding to information indicating whether an additional death benefit payment has been selected. If the additional death benefit payment has been selected, an additional death benefit is calculated.

In another embodiment of the present invention, a method that determines the benefits and costs of an annuity contract comprises determining whether an annuity contract includes a beneficiary rider and if the beneficiary rider has been selected, calculating an additional death benefit value.

In an additional embodiment of the present invention, an apparatus for calculating the benefits and costs of an annuity contract comprises a storage device and a processor coupled to the storage device. The storage device stores instructions that are utilized by the processor. The instructions comprise a receive instruction that instructs the processor to receive data comprising an annuity contract; a determine instruction that instructs the processor to determine whether the annuity contract includes a beneficiary rider; and a calculate instruction that instructs the processor to calculate an additional death benefit value, if the annuity contract includes the beneficiary rider.

Additional embodiments of the present invention include methods and apparatus for calculating costs associated with additional death benefits for the payment of taxes, funeral expenses and the like by the beneficiaries on a death benefit of an annuity contract.

DESCRIPTION OF THE DRAWINGS

Figure 1:
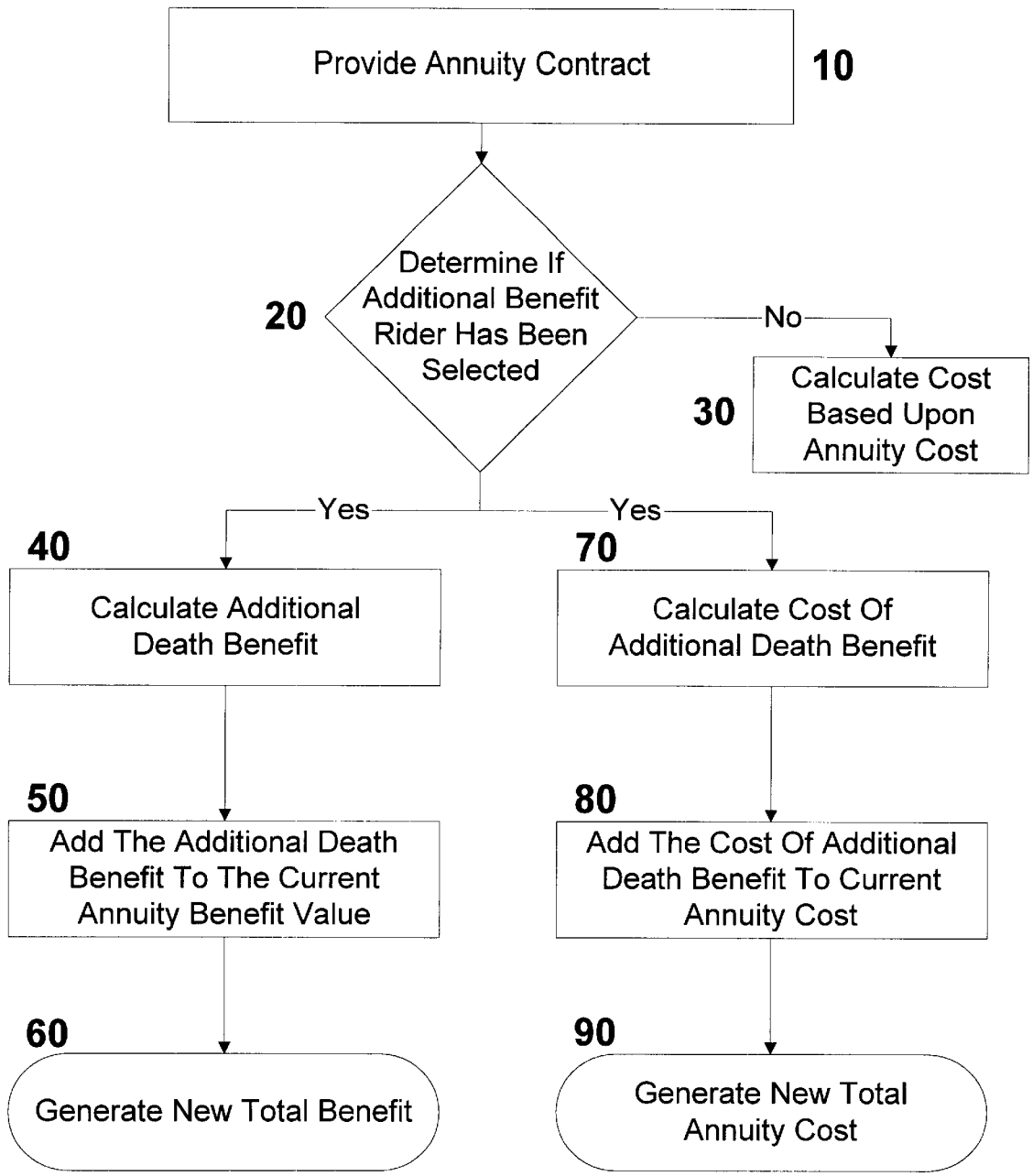
FIG. 1 illustrates an overview of a method that determines the benefits and costs related to an annuity for an additional death benefit according to a presently preferred embodiment of the present invention.

Turning now to FIG. 1, at step 10 an annuity contract is provided. The annuity contract can be any annuity that has any combination of terms, including any combination of, fixed or variable, certain or life term annuity, deferred or immediate, any type of death benefit, and surrender charges (if any). The annuity contract has also as part of the data an indication if the annuity contract provides a selection of whether the owner of the annuity contract has selected an additional death benefit. The selection of the additional death benefit, or beneficiary rider, can be selected at any time during the existence of the annuity contract, but is presently preferred to be limited only to the time when the annuity contract is being created and agreed to by the owner. The annuity contract can be stored as one or more records in one or more files in a computer, such as a database entry having one or more records. The selection of the beneficiary rider can be in the form of a record entry in a database, a variable in a separate file, a check box in a display, or any other means such that a computer or other data processing equipment can determine whether the beneficiary rider is selected. It is presently preferred that the beneficiary rider provides no additional cash value to the contract; the additional benefit occurs only upon the payment of the death benefit to the beneficiary.

It should be noted that although the additional death benefit is referred to as being part of a beneficiary rider, the present invention does not limit the use of the additional benefit to a rider or an amendment to an insurance or annuity contract. The additional death benefit may also be an integrated part of an original annuity or insurance contract, that is a stand alone policy that is simply associated with an annuity or insurance contract, or any similar arrangement.

At step 20, it is determined whether the beneficiary rider has been selected. This is done by reading the record entry in a database, variable in a separate file, check box in a display, or other method that allows the computer or other data processing equipment to determine whether the beneficiary rider is selected. It is presently preferred that the data related to the beneficiary rider is a binary choice of selection or non-selection of the beneficiary rider, such that step 20 is either a "yes" or "no" result. However, the present invention can be utilized so that step 20 determines which of a number of additional benefit levels is selected, each corresponding to a different income tax level. In this way the owner of the annuity can tailor the annuity for the perceived needs of the beneficiaries of any death benefit, e.g. their projected future tax bracket. In addition, the additional death benefit may also include payments for funeral expenses, state tax payments or the like. These can be taken into account by adjusting the benefit level to be in line with estimated future costs of each item.

At step 30, after having determined that no beneficiary rider has been selected, the system calculates the value of the death benefit and any costs associated with the annuity contract in the standard method for which it has been established. If a beneficiary rider has been selected then at step 40, the computer, processor or the like calculates the value of the Additional Death Benefit that is added because of the beneficiary rider. Next, at step 50, the Additional Death Benefit at step 40 is added to the Annuity Death Benefit as normally calculated by the system. Then, at step 60, a New Total Death Benefit is generated which is equal to the value added at step 50.

In a substantially parallel determination, at step 70, the costs to be charged for the Additional Death Benefit of the beneficiary rider is determined. Next, at step 80, the costs to be charged for the Additional Death Benefit of the beneficiary rider is added to the annuity cost. Then, at step 90, a new total cost is generated which is equal to the value at step 80. It should be noted that steps 70, 80 and 90 are presently preferred to occur; if the annuity contract does not require the computation of an additional cost, these steps do not have to be performed.

It should be noted that although steps 40, 50, 60, 70, 80 and 90 are depicted as occurring at substantially the same time their timing need not be the same and can occur seconds, minutes, hours or even days apart.

The above described process can be embodied as a computer program that instructs a computer to perform the desired determinations and calculations.

Figure 2:
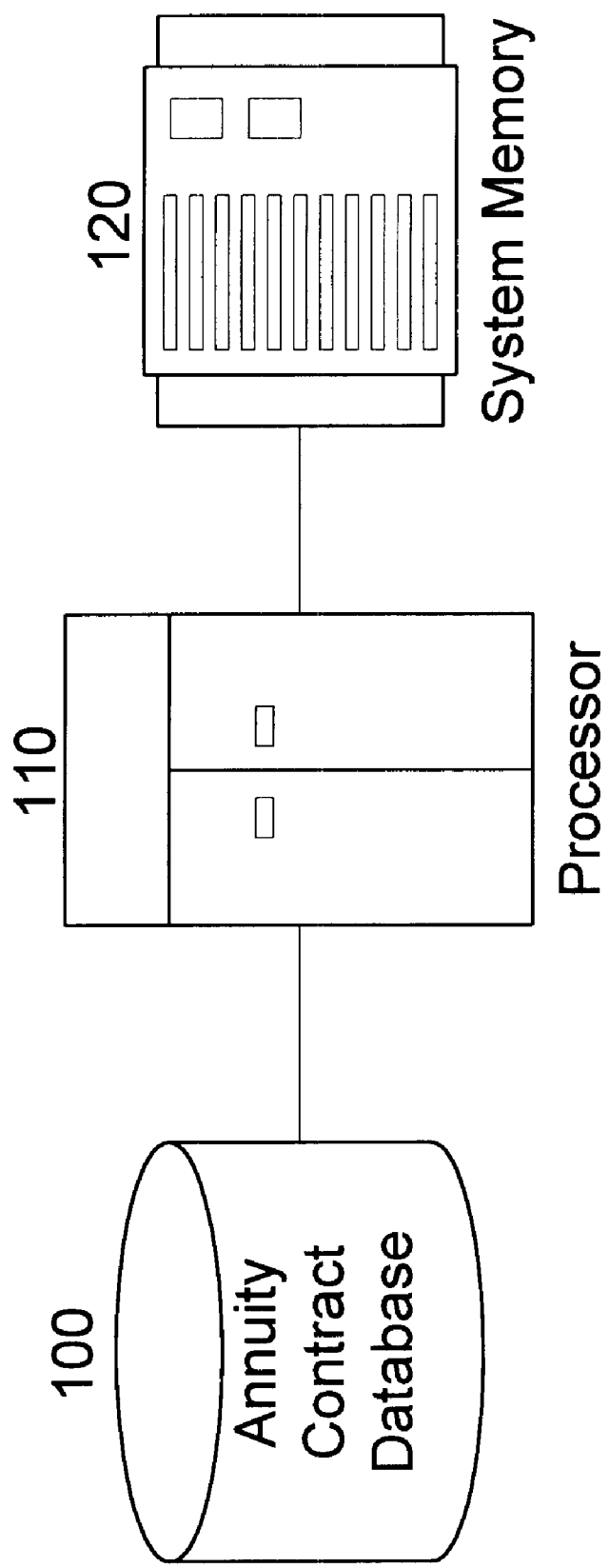
FIG. 2 illustrates an apparatus that determines the benefits and costs related to an annuity according to a presently preferred embodiment of the present invention.

Referring to FIG. 2, an apparatus for performing the methods of the present invention is depicted. An annuity contract database 100 contains the information regarding any number of annuity contracts. A processor 110 performs the calculations and determinations that are required with respect to the beneficiary rider. Processor 110 also reads and writes from the annuity contract database 100 in order to keep it updated and to write values. The system memory 120 contains the instructions for operating the processor. Although, the annuity database 100, processor 110 and system memory 120 are depicted as separate entities they can be part of a single computer, such as a personal computer, work station, mainframe or other computing device. Further, although system memory 120 is depicted as a disk array the instructions may reside in a tape drive, hard drive, zip drive or any other storage device that can be accessed by an appropriate processor 110. In FIG. 2, steps 10, 20, 30, 40, 50, 60, 70. 80, and 90 of FIG. 1 can be embodied as instructions of a computer program that instructs the processor to perform the desired operations.

Figure 3:
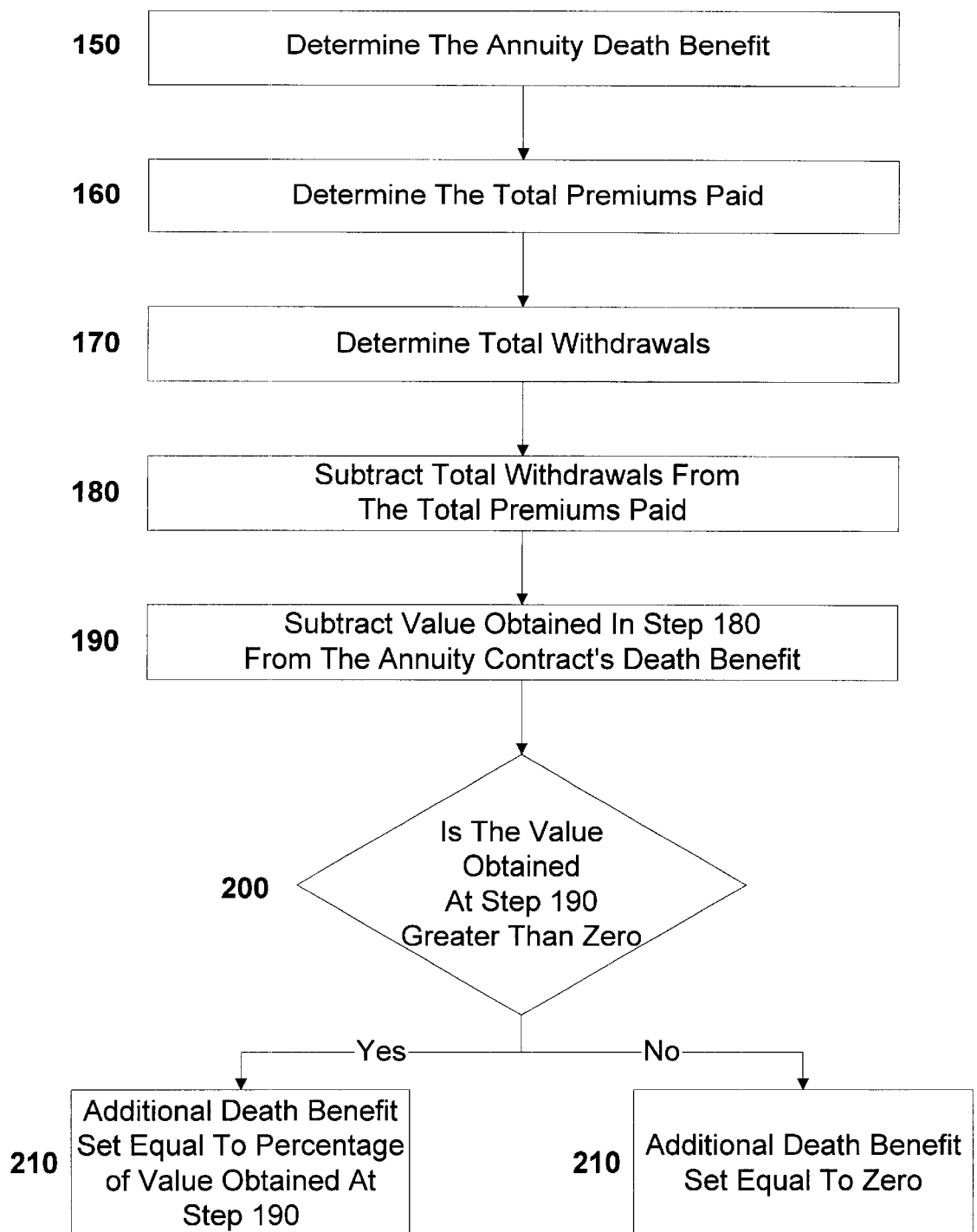
FIG. 3 illustrates a method for determining additional benefits for an additional death benefit for an annuity contract according to a presently preferred embodiment of the present invention.

Referring to FIG. 3, the Annuity Death Benefit to be paid is determined at step 150. The Annuity Death Benefit is the monthly value of the death benefit to be paid by the annuity contract as of the current date that this operation is being performed, without inclusion of the Additional Death Benefit. It should be noted that although the preferred calculation is based upon the monthly value of the annuity death benefit, this value can change on a daily basis depending upon the interest credited and or deductions processed from the annuity cash value. The calculation can also be made upon the yearly value of the annuity death benefit, and then can either be divided by twelve, for the twelve months, or can be manipulated in any desired fashion. Next, at step 160, the Total Premiums paid are determined. The Total Premiums paid equal the dollar amount paid into the annuity contract by the owner of the annuity. Then, at step 170, the Total Withdrawals from the annuity are determined. Total Withdrawals are the sum of all partial withdrawals, including any previously assessed surrender charges and any applicable Total Return Adjustment that each result in the Annuity Cash Value being less than the Certificate's Basis immediately after each withdrawal. If the beneficiary rider is elected prior to the Certificate's Effective Date, "Certificate's Basis" is defined as the sum of the Net Premiums paid, adjusted for the sum of all withdrawals (including any previously assessed surrender charges and any applicable Total Return Adjustment) that are in excess of the Certificate's gain. The Total Withdrawals also include payments to the owner of the annuity, any surrender charges, any total return adjustments, —or any administrative charges or investment expense or other fees that have been deducted from the annuity account either for its own maintenance or maintenance of the crediting rate method. The Total Withdrawals from the annuity are then subtracted from the total premium(s) paid into the annuity at step 180. It should be noted that in a preferred embodiment that the annuity utilized will not allow the Total Withdrawals to be greater than the Total Premiums paid into the annuity account and the value obtained at step 180 will not be less than zero. Following this, at step 200, it is determined whether value obtained at step 190 is greater than zero. Further, at step 210, if the value obtained at step 190 is greater than zero then an Additional Death Benefit is set to be the value obtained at step 190 multiplied by an appropriate percentage. If the value obtained at step 190 is less than or equal to zero then the Additional Death Benefit is set to zero. The currently preferred appropriate percentage can be a function of a perceived tax rate, and is presently preferred to be set at 28%. The result of step 210 is returned as the result of step 40 in FIG. 1.

Figure 4:
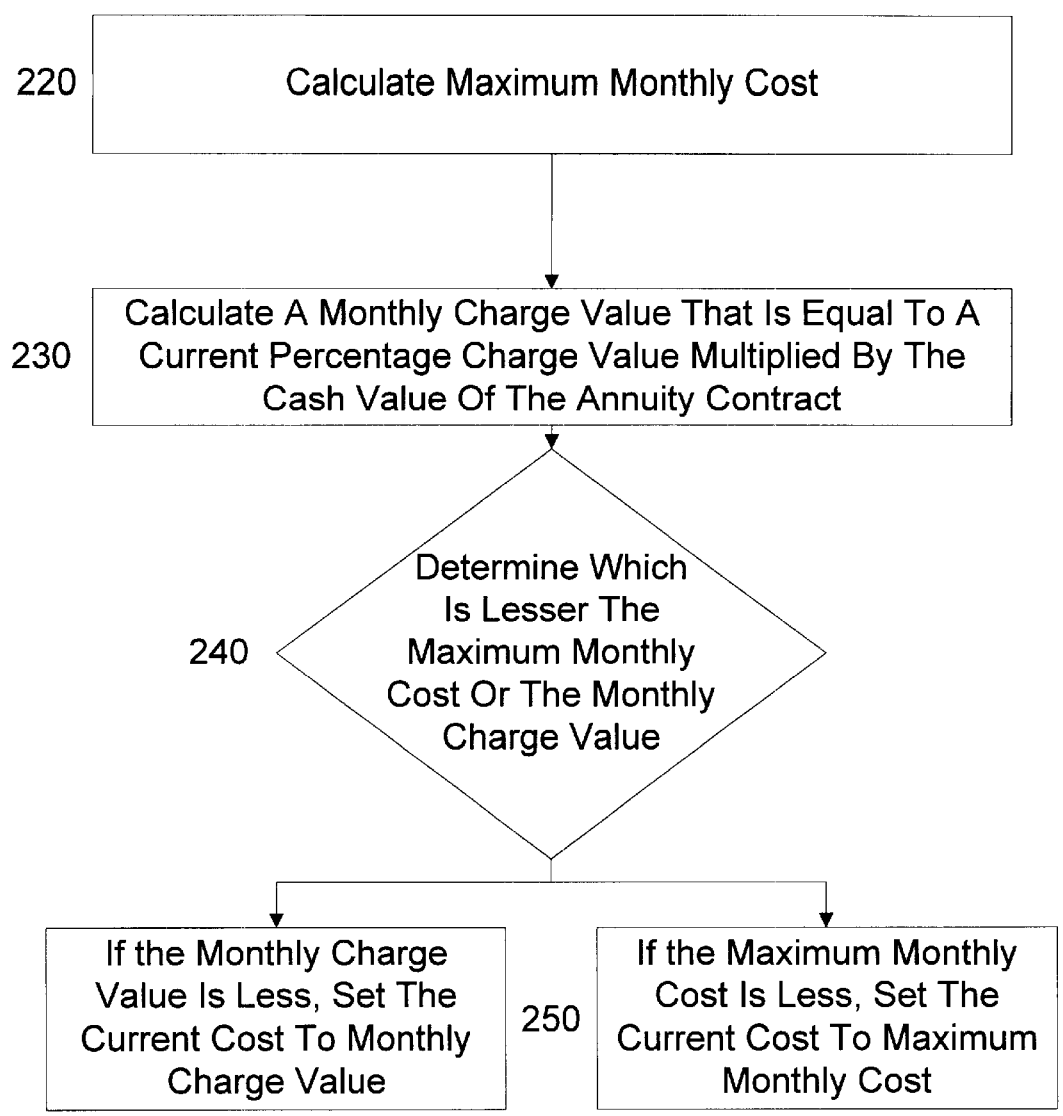
FIG. 4 illustrates a method for determining the monthly cost for an additional death benefit for annuity contract according to a presently preferred embodiment of the present invention.

Referring to FIG. 4, at step 220 the Maximum Cost of the beneficiary rider is determined. This is the maximum cost that will be charged for the beneficiary rider. The Maximum Monthly cost is presently preferred to be included as the part of the annuity contract, but is not necessary and the present invention can operate without a determination of a Maximum Monthly Cost. At step 230, a Monthly Charge Value is determined. The Monthly Charge Value is presently preferred to be a percentage value multiplied by the cash value of the annuity contract. Once the Monthly Charge Value and the Maximum Monthly Cost are both determined, the lesser of the two is determined at step 240. At step 250, if the Monthly Charge Value is less than the Maximum Monthly Cost the Current Cost is set to the Monthly Charge Value and if the Maximum Monthly Cost is less than the Monthly Charge Value then the Current Cost is set to the Maximum Monthly Cost. In this way, a limit to the cost charged for the beneficiary rider is maintained. The result of step 250 is then returned as the result of step 70 in FIG. 1.

The Maximum Monthly Cost is based upon a mortality rate value multiplied by the proceeds that are currently available under the beneficiary rider. The mortality rate value is presently preferred to be the 1980 Commissioner's Standard Ordinary (CSO) Male/Female Aggregate Age Last Birthday (ALB) Ultimate Rates. The age used to determine which 1980 CSO Male/Female Aggregate ALB Ultimate Rate to apply is the greater of the younger of A or B where: A is the age of the younger owner on the rider's effective date; and B is the age of the younger Annuitant on the rider's effective date.

The current percentage charge is selected from the table below:

| Issue Age | Twelve Times the Current Percentage Charge |
| --- | --- |
| 45 and below | 0.09% |
| 55 | 0.20% |
| 65 | 0.45% |
| 75 | 1.03% |
| 85 and above | 1.51% |

The issue ages above refer to the age of the owner of the policy. For issue ages not shown in the above table, a linear interpolation to four decimal places by utilizing the closest two issue ages.

Figure 5:
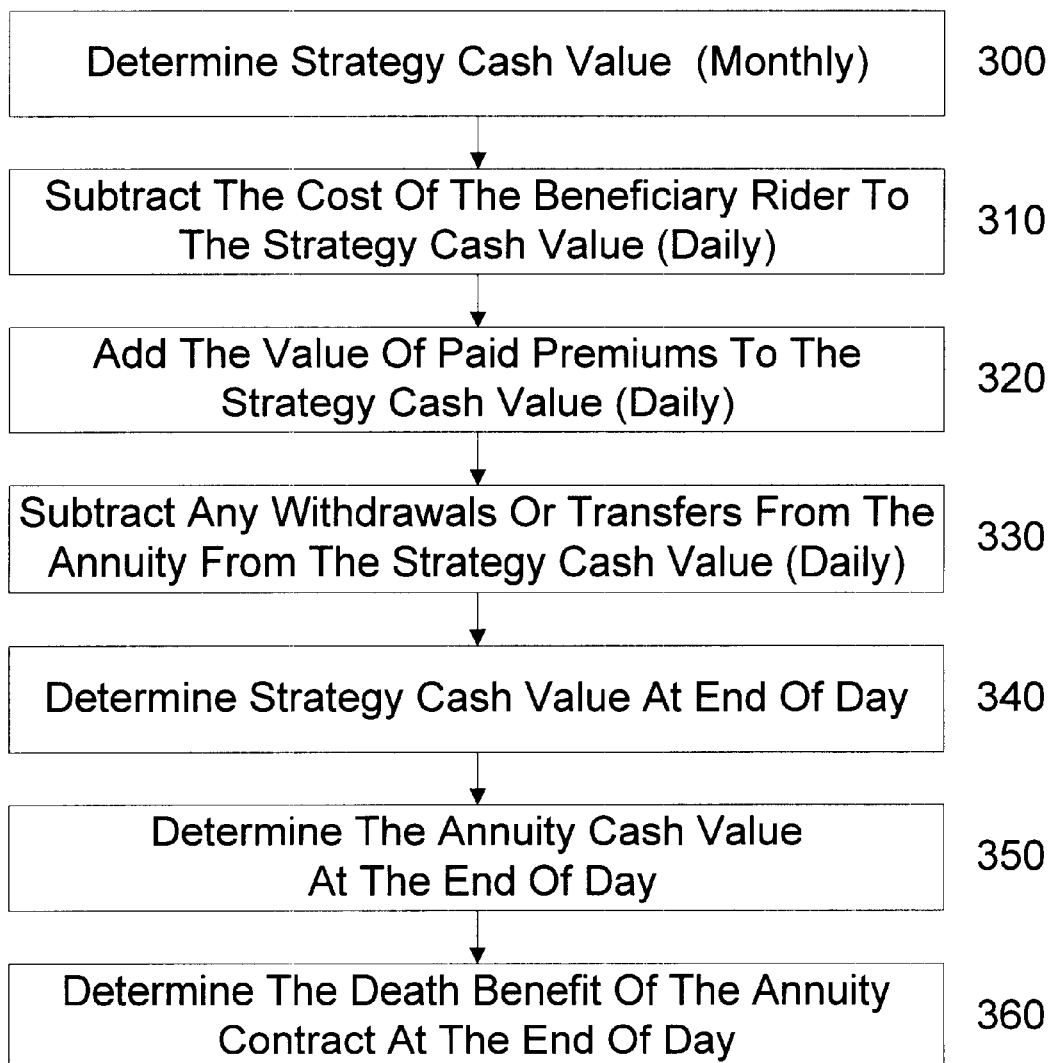
FIG. 5 illustrates the presently preferred method for determining the information necessary to calculate the benefits and costs for a beneficiary rider according to the present invention.

Referring to FIG. 5, the Strategy Cash Value at the Beginning of the Day is determined at Step 300. The Strategy Cash Value, which is the value of the annuity, is determined iteratively on a daily basis. It is increased by Premiums and interest credited and decreased by Withdrawals and Transfers (including Loans). Each of these activities is shown in steps 310, 320 and 330. At step 310 the cost of the beneficiary rider is determined and subtracted from the Strategy Cash Value. At step 320 the Daily Premiums paid in are added to the Strategy Cash Value. Further at step 330 any withdrawals or transfers made that day are subtracted from the strategy cash value. It should be noted that steps 310, 320 and 330 can be made in any order and not necessarily in the order depicted in FIG. 5. During step 340 the Strategy Cash Value at the End of the Day is determined after the calculations taken at steps 310, 320, and 330. Then at step 350 the Annuity Cash Value at the End of the Day of the contract is determined by summing the Strategy Cash Values at the End of the Day, after applying any applicable Total Return Adjustment. The Death Benefit at the End of the Day for the annuity contract is then determined in Step 360. This process repeats itself each day with the result of Step 340 equaling the value in Step 300 on the subsequent day.

While the invention has been disclosed in its preferred forms, many modifications, additions, and deletions can be made therein without departing from the spirit and scope of the invention and its equivalents as set forth in the following claims.

What is claimed is:

1. A method of preparing an annuity contract with an additional death benefit, the annuity contract being stored in a computer system, the method comprising:

generating data corresponding to an annuity contract, at least a portion of the data corresponding to information indicating whether an additional beneficiary rider has been selected;

if the additional beneficiary rider has been selected as part of the annuity contract, calculating an additional death benefit to be added to the payments to be provided by the annuity contract, calculating the steps of:

a) determining the death benefit to be paid out according to the annuity contract;

b) determining the total of all of the premiums paid into the annuity contract;

c) determining the total of any withdrawals from the annuity contract;

d) subtracting the total of any withdrawals from the total of all of the premiums paid into the annuity contract to generate a first subtracted total;

e) subtracting the first subtracted total from the death benefit to be paid out according to the annuity contract to generate a second subtracted total;

f) if the second subtracted total is greater than zero, setting the additional death benefit to a value of the second subtracted total multiplied by a selected percentage value wherein the selected percentage value is approximately equal to 28%; and g) if the second subtracted total is less than or equal to zero, setting the additional death benefit value to zero;

and adding the additional benefit to the current annuity benefit to generate a total death benefit resulting in the preparation of the annuity contract.

2. The method of preparing an annuity contract with an additional death benefit, the method determining the tax benefits and costs for an annuity contract comprising:

generating an annuity contract;

determining whether the annuity contract includes a beneficiary rider selected by the owner of the annuity contract;

if the beneficiary rider has been selected, calculating an additional death benefit for the annuity contract;

a) determining a rider value based upon a death benefit to be provided by the annuity contract by:

subtracting the total of any withdrawals to date from a total of all of the premiums paid into the annuity contact to generate the total paid in value;

subtracting the total paid in value from the additional death benefit to be provided by the annuity contract to generate a total value;

determining if the second subtracted total is greater than zero;

if the second subtracted total is greater tan zero, setting the rider value to a value of the second subtracted total multiplied by a percentage value, wherein the percentage value is approximately equal to 28%; and if the second subtracted total is less than or equal to zero, setting the rider value to zero;

b) determining the total paid in value; and c) setting the additional benefit to the rider value; and adding the additional benefit to a death benefit to be paid out by the annuity contract resulting in the preparation of the annuity contact.

3. The method of claim 2 wherein the step of determining a rider value comprises the steps of:

subtracting a total of any withdrawals to date from a total of all of the premiums paid into the annuity contract to generate the total paid in value;

subtracting the total paid in value from the additional death benefit to be provided by the annuity contract to generate a total value;

determining if the second subtracted total is greater than zero;

if the second subtracted total is greater than zero, setting the rider value to a value of the second subtracted total multiplied by a percentage value; and if the second subtracted total is less than or equal to zero, setting the rider value to zero.

4. An apparatus for calculating tax benefits and costs for an annuity contract comprising:

a storage device; and a processor coupled to the storage device, the storage device storing instructions that are utilized by the processor, the instructions comprising:

a receive instruction that instructs the processor to receive data comprising an annuity contract;

a determine iron that instructs the processor to determine whether the annuity contract includes a beneficiary rider;

a calculate instruction that instructs the processor to calculate an additional death benefit, if the annuity contract includes the beneficiary rider, comprising:

a) a first calculate instruction that instructs the processor to determine a rider value based upon a death benefit to be provided by the annuity contact and the total paid in value; and b) a second calculate instruction that instructs the processor to set the additional death benefit to the rider value; and c) a third calculate instruction that instructs the processor to subtract a total of any withdrawals to date from a total of all of the premiums paid into the annuity contract to generate the total paid in value;

d) a fourth calculate instruction that instructs the processor to subtract the total paid in value from the death benefit to be provided by the annuity contract to generate a total value;

e) a fifth calculate instruction to determine if the second subtracted total is greater than zero; and f) a sixth calculate instruction to set the additional death benefit to a value of the second subtracted total multiplied by a percentage value, wherein the percentage value is approximately equal to 28%, to zero if the subtracted total is greater than zero; and combine instruction that instructs the processor to add the additional benefit to the current annuity death benefit, if the annual contract includes the beneficiary rider that results in the preparation of the annuity contract.

5. The apparatus of claim 4 wherein the first calculate instruction comprises:

a third calculate instruction that instructs the processor to subtract a total of any withdrawals to date from a total of all of the premiums paid into the annuity contract to generate the total paid in value;

a fourth calculate instruction that instructs the processor to subtract the total paid in value from the death benefit to be provided by the annuity contract to generate a total value;

a fifth calculate instruction to determine if the second subtracted total is greater than zero; and a sixth calculate instruction to set the additional death benefit to a value of the second subtracted total multiplied by a percentage value and to set the additional death benefit value to zero depending on if the subtracted total is greater than zero.

\* \* \* \* \*